United States Patent [19]

Avakian et al.

[11] Patent Number: 5,186,269
[45] Date of Patent: Feb. 16, 1993

[54] METHOD OF AND APPARATUS FOR MOTORIZING MANUALLY POWERED VEHICLES

[75] Inventors: Emik A. Avakian, 67 Applewood Dr., Chicopee, Mass. 01022; James V. Masi, Wilbraham, Mass.

[73] Assignee: Emik A. Avakian, Chicopee, Mass.

[21] Appl. No.: 789,054

[22] Filed: Nov. 7, 1991

Related U.S. Application Data

[63] Continuation-in-part of Ser. No. 521,352, May 9, 1990, abandoned.

[51] Int. Cl.5 .............................................. B62D 11/02
[52] U.S. Cl. .................................... 180/6.5; 180/65.6; 180/385; 180/907; 301/6.5
[58] Field of Search ................... 280/304.1, 304.2; 301/6 D, 6 R, 6 V; 310/49 R, 114; 318/139; 180/6.48, 6.5, 65.1, 65.5, 65.6, 342, 343, 383, 385, 907

[56] References Cited

U.S. PATENT DOCUMENTS

| 28,631 | 6/1860 | Cummings | 301/6 D |
|---|---|---|---|
| 1,378,563 | 5/1921 | Schofield | 301/6 D |
| 2,630,348 | 3/1953 | Schuricht | 301/6 D |
| 3,770,073 | 11/1973 | Meyer | 180/385 X |
| 3,908,776 | 9/1975 | Dudley | 180/65.5 |
| 4,037,676 | 7/1977 | Ruse | 180/6.5 |
| 4,115,670 | 9/1978 | Chandler | 200/5 R |
| 4,125,169 | 11/1978 | Harris et al. | 180/907 X |
| 4,341,278 | 7/1982 | Meyer | 180/79.1 |
| 4,421,336 | 12/1983 | Petrofsky et al. | 280/252 |
| 4,424,873 | 1/1984 | Terlack | 180/65.1 |
| 4,512,613 | 4/1985 | Nassiri | 301/1 |
| 4,671,524 | 6/1987 | Haubenwallner | 280/212 |
| 4,772,815 | 9/1988 | Harned et al. | 310/171 |
| 4,773,494 | 9/1988 | Anderson | 180/907 X |
| 4,773,495 | 9/1988 | Haubenwallner | 180/65.2 |
| 4,805,771 | 2/1989 | Lautzenhiser | 180/907 X |

*Primary Examiner*—David M. Mitchell
*Assistant Examiner*—Michael Mar
*Attorney, Agent, or Firm*—Chilton, Alix & Van Kirk

[57] ABSTRACT

Apparatus which enables a foldable wheelchair to be retrofitted with an electrical propulsion system without significantly compromising the ability to fold the chair. The apparatus includes a drive unit for each wheel to be driven. The drive units can be mounted on the stationary axles of the driven wheels and apply torque, generated by a separate motor in each drive unit, to the wheels at a plurality of symmetrically located points which are radially displaced from the axles.

14 Claims, 8 Drawing Sheets

METHOD OF AND APPARATUS FOR MOTORIZING MANUALLY POWERED VEHICLES

CROSS-REFERENCE TO RELATED APPLICATION

This application is a continuation-in-part of application Ser. No. 521,352 filed May 9, 1990 now abandoned.

BACKGROUND OF INVENTION

1. Field of the Invention

The present invention relates to the motorizing of wheeled conveyances and particularly to the provision of an electrical drive system which may be installed on existing manually powered wheelchairs or carts. More specifically, this invention is directed to a technique for adding an electromechanical drive to a wheelchair, and especially a conventional foldable chair, without impeding the ability to collapse the chair for vehicle transportation and/or storage. Accordingly, the general objects of the present invention are to provide novel and improved apparatus and methods of such character.

2 Description of the Prior Art

While not limited thereto in its utility, the present invention is particularly well suited for use in the conversion of conventional, foldable wheelchairs to motorized chairs. Most manually driven wheelchairs which are presently in use employ a dual-planar, tubular frame construction which has been available since the early 1940's. The motorized chairs which are commercially available are, for the most part, specifically designed for powered operation and cannot be folded. The inability to fold presents a problem for many disabled persons since it precludes the convenient transport of their motorized wheelchairs by car. Further, because of their uniquely designed frame construction, presently available motorized wheelchairs are comparatively costly and it must be noted that the added expense is greater than the cost of the motor(s) and related power supply and control circuitry.

It should be noted that, in order to remove the motors and power supply from a conventional motorized wheelchair in the interest of reducing weight and thereby enabling the lifting of the chair into a motor vehicle or aircraft, specialized tooling is customarily required and above-average mechanical skills are necessary. Also, further adding to the cost and complexity of presently available motorized wheelchairs, a mechanical release mechanism is required in order to disengage the motors thereby rendering it possible to push the chair manually.

Previous wheelchair motorized drive systems have taken a number of forms. Such systems may, for example, employ pinch rollers which contact the tires of the two large driven wheels of the chair in order to propel the chair. Among the disadvantages of the use of such pinch rollers are their inherent inefficiency, the uneven wheelchair tire wear they produce and the ever present danger of the user's hand becoming pinched between the roller and tire. Drive systems having motors that drive the wheels of a wheelchair via a chain mechanism or a friction belt are also available. In either case, the possibility is present for injury to the user because of the entanglement of clothing in the drive or the actual catching of a hand or finger in the drive.

U.S. Pat. Nos. 4,773,495 and 4,671,524 discuss drive mechanisms which are housed in the wheel hub of a wheelchair. U.S. Pat. No. 3,908,776 also discloses a special hub design for housing a drive mechanism. All of the prior hub mounted drive mechanisms are technically complex and require a special frame for the wheelchair. Thus, the mechanisms of the aforementioned patents cannot be employed to retrofit existing foldable wheelchairs.

U.S. Pat. Nos. 4,773,495 and 4,671,524 disclose rather elaborate means for disconnecting the motors from motorized wheelchairs in order to enable the transport of such chairs. In the patented drive systems power is transmitted from the motor shafts to the wheelchair wheels via a system of gearing and manual propulsion of the chair is not possible without interrupting the drive trains between the motors and wheels. U.S. Pat. No. 4,672,524 discloses another wheelchair drive wherein the driving means is located on a different axis from the driven wheel.

Many prior art motorized wheelchairs utilize friction drives. A friction drive for a wheelchair is exemplified by the disclosure of U.S. Pat. No. 4,037,676. The friction drive of U.S. Pat. No. 4,037,676 requires a special wheel which is provided with a friction drive surface on the inwardly facing surface of the rim. U.S. Pat. No. 4,424,873 discloses a friction drive which employs a belt to transmit power. All friction drives share the common deficiency of requiring constant maintenance. Other examples of the prior art relative to electric motor-driven wheelchairs may be seen from U.S. Pat. Nos. 3,770,073; 4,125,169; 4,512,613; 4,341,278; 4,421,336 and 4,115,670. The latter three of these patents all relate to control circuitry and command signal generators. Another electric wheelchair drive is depicted in U.S. Pat. No. 4,805,711 which is primarily related to the generation of command signals for the drive motors. U.S. Pat. No. 4,773,494 discloses a hydraulic drive for a wheelchair.

SUMMARY OF THE INVENTION

The present invention overcomes the above-briefly discussed and other deficiencies and disadvantages of prior art and, in so doing, motorizes an existing or conventional conveyance, such as a foldable wheelchair, in a manner which is comparatively inexpensive, adds relatively little weight and does not place the frame of the conveyance under undue stress. Most importantly, the present invention does not interfere with the ability to fold the chair subsequent to motorization. The present invention also encompasses apparatus for implementing the aforesaid method, such apparatus comprising a direct drive unit associated with each of the drive wheels of the chair or cart to be motorized. Each of the drive units employed, two in the case of a retrofitted conventional foldable wheelchair, includes an electric drive motor and is packaged in a manner which insures against operator injury. The drive units will typically be installed with their motors in staggered locations so that the drives will not significantly interfere with folding. Also, in accordance with the invention, the rotational forces are simultaneously applied to the driven wheels at plural, symmetrically distributed points. Further, these force application points are displaced from the axis of rotation of the wheel by a distance which is at least thirty percent of the wheel radius. Another important characteristic of a drive unit in accordance with the invention is the integration of the drive motor and the means by which the motor generated torque is delivered to the wheel into a single structure. This integration minimizes stress on the frame of the conveyance being motorized. The drives of the present invention are, as an added advantage, characterized by the ability to be installed without special tools and by an individual having average mechanical dexterity.

Apparatus in accordance with the present invention is fully compatible with more than 90% of the wheelchairs which are presently in us and takes advantage of the standardization of the dual-planar, tubular frame construction employed in existing foldable wheelchairs. The present invention, in a preferred embodiment, is also characterized by the employment of digital control circuitry for the drive motors and, consequently, takes advantage of the compactness and economy of use of a microprocessor for generating the desired or necessary control signals and for insuring safe operation.

A drive system in accordance with the present invention is uncomplicated and thereby characterized by minimal maintenance requirements. The motors employed in this uncomplicated drive system are, in the preferred embodiment, stepping motors. The stepping motors may be driven in either a closed loop mode, employing shaft encoders or other suitable feedback means or in an open loop mode. When employing the preferred closed-loop control, each wheel will turn at the exact speed commanded by the control circuitry independent of the differences in the surface of the terrain under each wheel up to the maximum torque capability of the system. The use of stepping motors enables the gearing down of the motor by a factor which is much lower than has characterized the prior art, since torque is applied in minimum increments or steps, and the drive mechanism accordingly does not have to be disengaged from the driven wheel in order to permit the chair to be pushed manually when desired.

BRIEF DESCRIPTION OF THE DRAWINGS

The present invention may be better understood and its numerous objects and advantages will become apparent to those skilled in the art by reference to the accompanying drawing wherein like reference numeral refer to like elements in the several figures and in which.

DESCRIPTION OF THE DISCLOSED EMBODIMENT

With reference now to the drawings, the implementation of the present invention in the form of an add-on electromechanical drive for a standard dual-planar, tubular frame construction wheelchair is shown. While the present invention has been disclosed and will be described in connection with the motorizing of a chair having four wheels, including two large rearwardly disposed drive wheels, it will be understood by those skilled in art that any conveyance having a pair of drive wheels can benefit from the modularly configured wheel drive mechanisms of the present invention.

Figure 1:
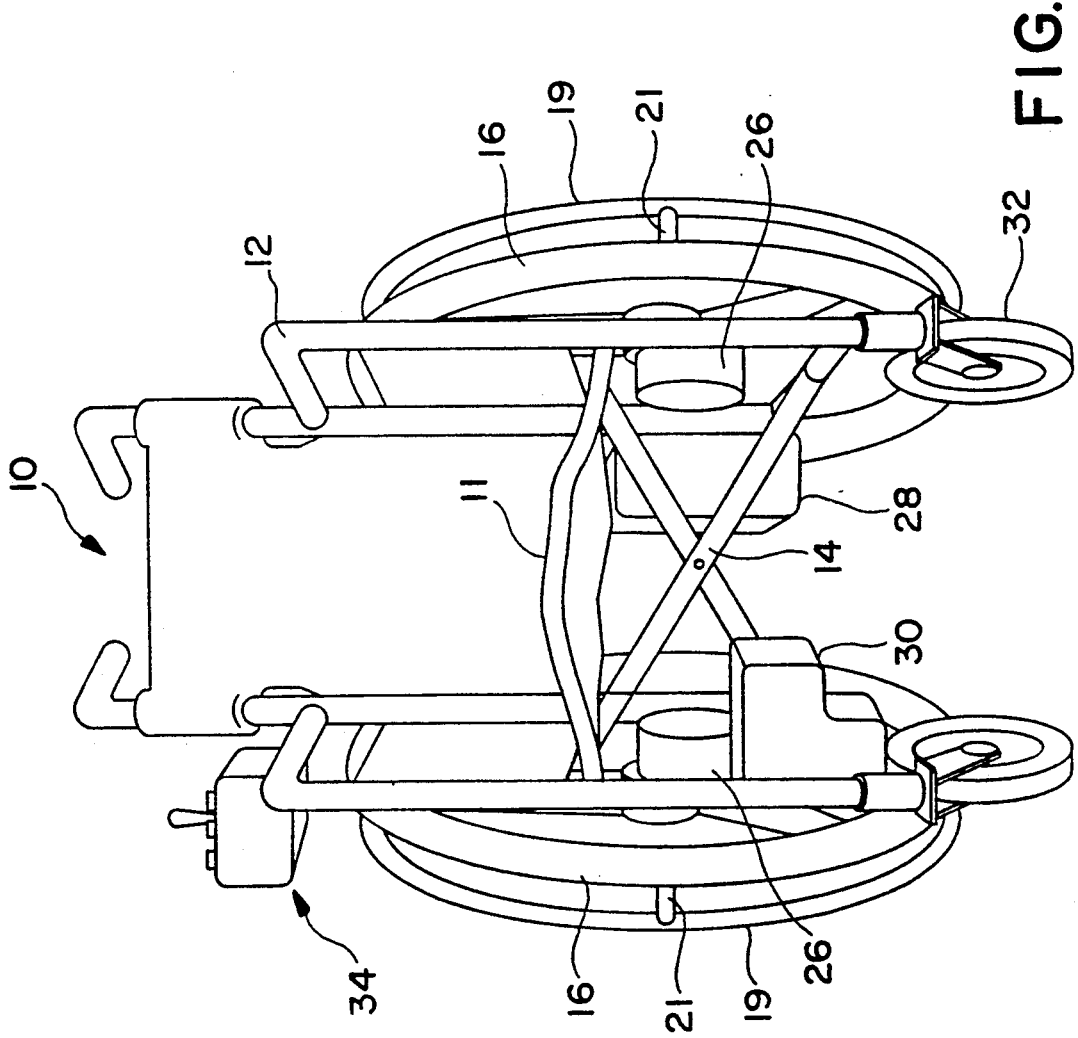
FIG. 1 is a front view of a standard foldable wheelchair, having a dual-planar tubular frame construction, retrofitted with the present invention and in a partly folded condition.

As represented in FIG. 1, a standard foldable wheelchair, indicated generally at 10, has a frame consisting of two identical planar side frames joined below the seat 11 by an X-frame assembly 14. The four ends of the arms of the X-frame are fixed to tubular members which rotate about rods, two on each side frame, as the chair is folded. The large, i.e., driven, wheels 16 of the chair are mounted to respective of the side frames by standard bolts 18 (FIG. 2) which serve as axles. The axle/bolts 18 engage vertical sections of the tubular side frames 12 and do not rotate. As may best be seen from FIG. 10, the wheels 16 are provided with handrails 19 which are attached to the wheels by means of bolts 20 and standoffs 21.

The wheelchair depicted in FIG. 1 has fixed arm rests. When the wheelchair is provided with removable arm rests, the axle/bolts are lengthened to provide additional space for the sockets which receive the removable arms. A removable arm rest is indicated at 23 in FIG. 2. One of the spacers which is included when removable arm rests are employed is indicated in phantom at 23' in FIG. 2 and will be removed when a chair is motorized in accordance with the invention.

It is to be noted that, although there has been no substantial change in the basic design of dual-planar tubular frame construction wheelchairs in almost 50 years, in the past 10 years there has been a tendency to replace wire spoke wheels with molded wheel hubs having integral spokes.

Figure 4:
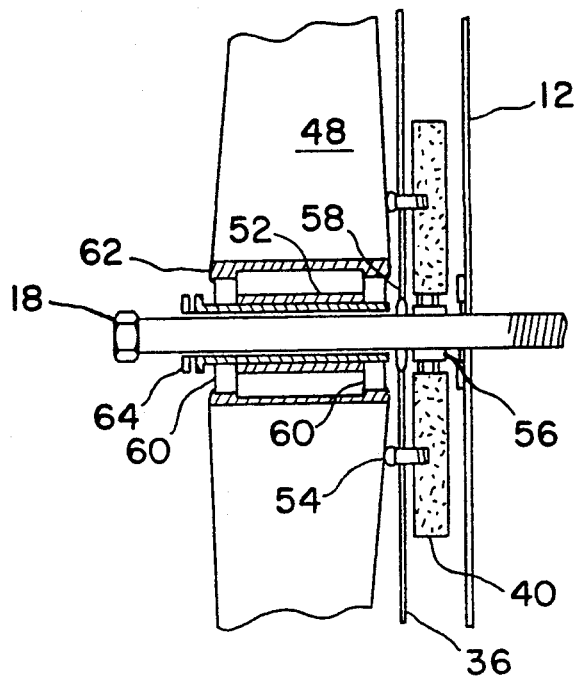
FIG. 4 is a cross-sectional view taken transverse to the view of FIG. 3.

The driven wheels 16 of the standard manually operated wheelchair are provided with ball bearing subassemblies, indicated at 60 in FIG. 4, within the wheel hubs and each of the driven wheels is free to rotate about an axle/bolt 18 on these bearing assemblies. The axle/bolts are secured to the frame by means of a nut, as indicated at 24 in FIG. 2, which is tightened against the side frame 12 in the region under the chair seat.

Figure 11:
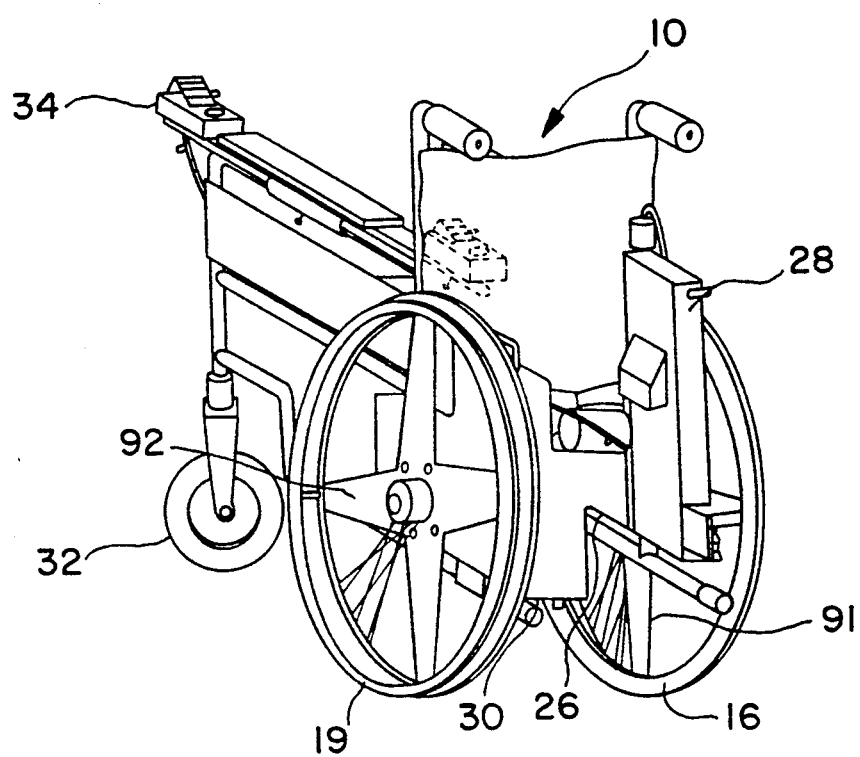
FIG. 11 is a partial perspective view of a wheelchair with the wheel drive system of FIG. 10 installed thereon.

Continuing to refer to FIG. 1, a drive system in accordance with the present invention will include a pair of motors, one of which is indicated generally at 26, supported in the manner to be described below beneath respective sides of the seat 11. An electronic control unit, indicated generally at 28, is attached to one of the motor support plates behind the right vertical frame of the chair. A battery pack or holder, indicated generally at 30, is also removably supported in any suitable manner from the chair frame. In the embodiment of FIG. 1, the battery holder 30 is generally T-shaped and is coupled to the frame 12. Alternatively, the battery holder 30 can be some other convenient shape, L-shaped for example as shown in FIG. 11, and can be anchored to a side frame end tube 31 which is used as a kick point to raise the front wheels 32 of the chair off the ground by a caretaker who is manually pushing the chair. A drive system in accordance with the present invention also includes a control or command signal generation unit, indicated generally at 34, which may include a joystick, an off/on switch, a horn and an electronic brake switch.

In the typical installation, the drive motors 26 are situated in front of the axes of the driven wheels 16 while the battery holder 30 is located with its center of gravity below the axis of the adjacent driven wheel. The battery location insure that the chair will not have a tendency to tip backwards, even in cases where the user is an amputee and does not have the weight of his legs on the front of the chair.

Continuing to discuss the mounting of a battery holder 30, it is to be noted that the holder will be configured such that, when mounted, it will not extend beyond the circumference of the adjacent driven wheel. This care in the design of the battery holder is necessary to ensure that it will not interfere with the tipping of a chair as is accomplished when it is backed over a step. It will also be obvious to those skilled in the art that means, for example a "wheelie bar" with a small wheel at the end, may be attached to one or both of the chair side frame ends after the battery holder is secured in place in order to insure the chair will not tip over in the backward direction.

Figure 2:
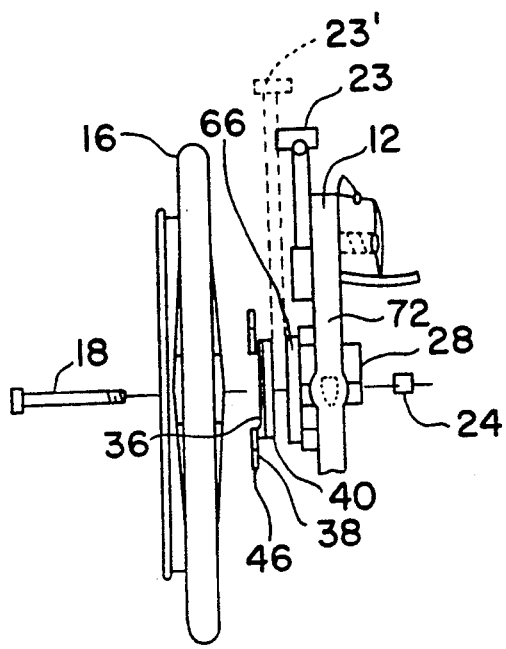
FIG. 2 is a front view of the left drive wheel of the retrofitted chair of FIG. 1, FIG. 2 also showing a portion of a wheelchair frame having a removable arm rest.
Figure 3:
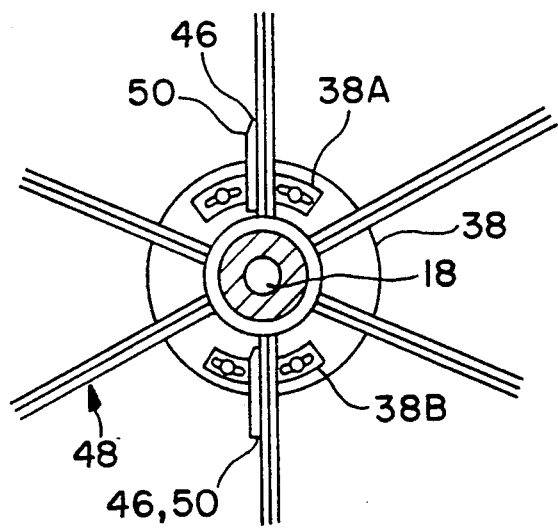
FIG. 3 is an enlarged, side elevation view depicting the hub of the wheel of FIG. 2, FIG. 3 showing a spoke drive disc with its two spoke tab brackets.

FIG. 3 is a partial, side elevation view of the hub portion and the spokes of one of the molded wheels 16 of the chair of FIG. 1. In accordance with the embodiment of FIGS. 2 through 8, a spoke drive disc 36, which may be seen in FIGS. 2, 3, 4, 5, 7 and 8, is positioned behind, i.e., inside, each of the driven wheels 16. Drive disc 36, which has not been shown to scale relative to the other components of the drive, is provided with at least a pair of adjustable tab brackets 38. A gear 40 is either affixed to or formed integral with disc 36. Gear 40 is driven in the manner to be described below and, as gear 40 rotates, rotational motion is imparted to disc 36 and the brackets 38, a pair of brackets 38A and 38B being shown in FIGS. 3, 7 and 8. In the FIGS. 2-8 embodiment, a pair of brackets 38 is attached to each drive disc 36. There may, however, be more than two of the brackets 38 adjustably mounted on each drive disc. As will become apparent from the discussion below, the disc 36 and brackets 38 define lever arms which apply the torque produced by an associated drive motor to the wheel simultaneously at plural, symmetrically arranged points which are radially displaced from the axis of rotation of the wheel by a significant distance.

Referring to FIGS. 3 and 4, the adjustable spoke tab brackets 38A and 38B are fastened to the spoke drive disc 36 by means of screws 42 which pass through slots 44 in each bracket. The screws 42 engage tapped holes in the disc 36. As may be seen from FIG. 5, the tapped hole pattern in the disc 36 permits mounting and adjustment of the brackets 38 so as to accommodate the particular wheel, regardless of whether it has molded or wire spokes.

The embodiment of FIGS. 2 through 8 takes advantage of the fact that, as noted above, the driven wheels of most wheelchairs presently in use have molded spokes 48 comprised of either plastic or metal.

The brackets 38 are each provided with an outwardly projecting tab 46 which is of sufficient length to engage a wheel spoke 48. Rubber pads 50 are preferably secured, in any suitable manner, to the tab projections 46 to provide a resilient interface between the spokes and the tabs. The resilient interface permits a tab to be tightened against a cooperating spoke and minimizes "backlash" when the direction of rotation of the gear 40 is reversed. In actual practice, in the interest of uniformity and facilitating assembly, the resilient pads 48 are affixed to both sides of the tabs.

Figure 6:
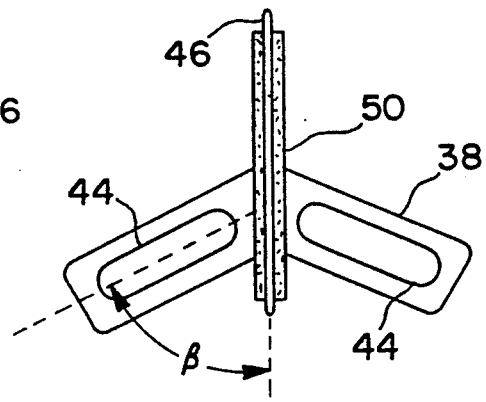
FIG. 6 is a front elevation view of one of the spoke tab brackets of FIG. 3.

The brackets 38 of a cooperating pair of brackets are arranged so that a wheel spoke 48 will be engaged and thus driven by a tab in either direction of wheel rotation. Thus, the tab 46 on bracket 38B will drive the wheel in a counterclockwise direction while the tab 46 on bracket 38A will drive the wheel in the clockwise direction. As indicated in FIG. 6, the center lines of the slots 44 in the tab brackets 38 intersects a plane defined by the wheel engaging projection 46 at an angle "a". The slots 44 allow the tab bracket to be adjusted when the motor drive kit is installed such that, when all of the brackets are properly aligned, there will be minimum backlash as the motor drives the wheel in the forward and backward directions of travel of the chair. In the disclosed embodiment, the angle "a" is approximately 70°. This angle "a" is a compromise chosen to ensure that the bracket mounting bolts 42 and their associated washers 43 are most effective in holding the bracket in the selected position in the face of the tangential force against the tab exerted by the engaged spoke. Restated, the bolts 42 maintain the position of the bracket 38 more readily because the center lines of the slots 44 are not tangentially oriented relative to the force applied to the wheel engaging tab projection 46.

As a alternative to the use of brackets and associated spoke engaging tabs as described above, and in accordance with the preferred embodiment of the invention as will be described below in the discussion of FIGS. 10 and 11, drive disc 36 can be coupled to the wheel by establishing a mechanical connection between the handrail 19 and the disc.

An important feature of the present invention, regardless of which of the disclosed embodiments is implemented, is that the rotational force generated by a drive motor is applied to the associated wheel at plural points and these plural drive points are symmetrically arranged and are radially displaced from the axis of wheel rotation in the interest of minimizing the forces applied to the chair frame. Conventional foldable wheelchairs are designed and built with the intent that the propulsive forces can and will be applied by the user to the handrails 19. Manufacturers of foldable wheelchairs, in fact, do not recommend add-on electrical or hydraulic drives on the grounds that such drives increase wear and tear on the chair frame. This is, in fact, a legitimate claim when a small diameter drive is employed such as, for example, in the case of a friction drive where small friction wheels contact the tires of the driven wheels, or where the driving torque is applied at the axis of the driven wheel. The present invention, in comparison to the prior art, is thus characterized by a relatively large diameter driving means. Restated, in accordance with the present invention, the force generated by a drive motor is applied to the wheel at points which are displaced by a significant distance from the axis of rotation. In the case of the embodiment of FIGS. 2-8, in actual practice the diameter of the drive disc 36 and the dimensions of the brackets 38 will be selected such that the tabs 46 will engage the spokes at points which are displaced from the axis of wheel rotation by a distance which is at least thirty percent (30%) of the wheel radius to insure that stresses on the wheelchair frame will be within acceptable limits. In the case of the embodiment of FIGS. 10 and 11, the points of force application are where intended by the chair manufacturer, i.e., at the handrails.

Figure 5:
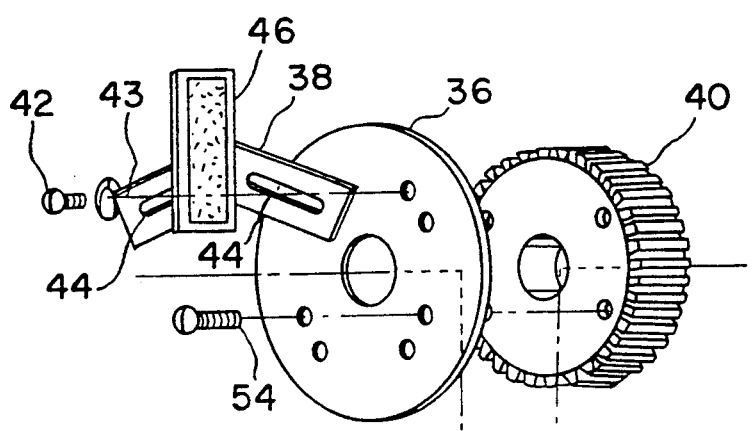
FIG. 5 is an exploded perspective view of that portion of the drive system of the present invention depicted in FIG. 4.

Referring to FIG. 4, it may be seen that the gear and drive disc subassembly described above can be easily installed simply by being slipped over an axle/bolt 18 from one side of the wheel while the bolt 18 remains in the main sleeve 52 in the wheel so as to be ready to be replaced on the wheelchair side frame 12. In the case where the spoke drive disc 36 is a separate component from gear 40, the drive disc is secured to the gear by means of screws 54. Where the wheelchair has a removable arm, as indicated in FIG. 2, the above-described subassembly including the drive disc, tab brackets and gear may simply be mounted on the existing axle/bolt 18. However, when the chair does not have a removable arm, and thus the spacer 22 is not present, the existing axle/bolt 18 is replaced with a slightly longer bolt. In either case, the non-threaded portion of the axle/bolt passes through the wheel hub and the gear 40. A bearing 56 is provided in gear 40, as shown in FIGS. 4 and 5, and a spacer 58 is placed on the bolt 18 between the wheel and the drive subassembly, i.e., between the sleeve 52 and the bearing 56. The bearing arrangement for the wheel, namely the bearing subassemblies 60, the outer bushing 62, the spacer 64, and the sleeve 52 remains unchanged.

Figure 7:
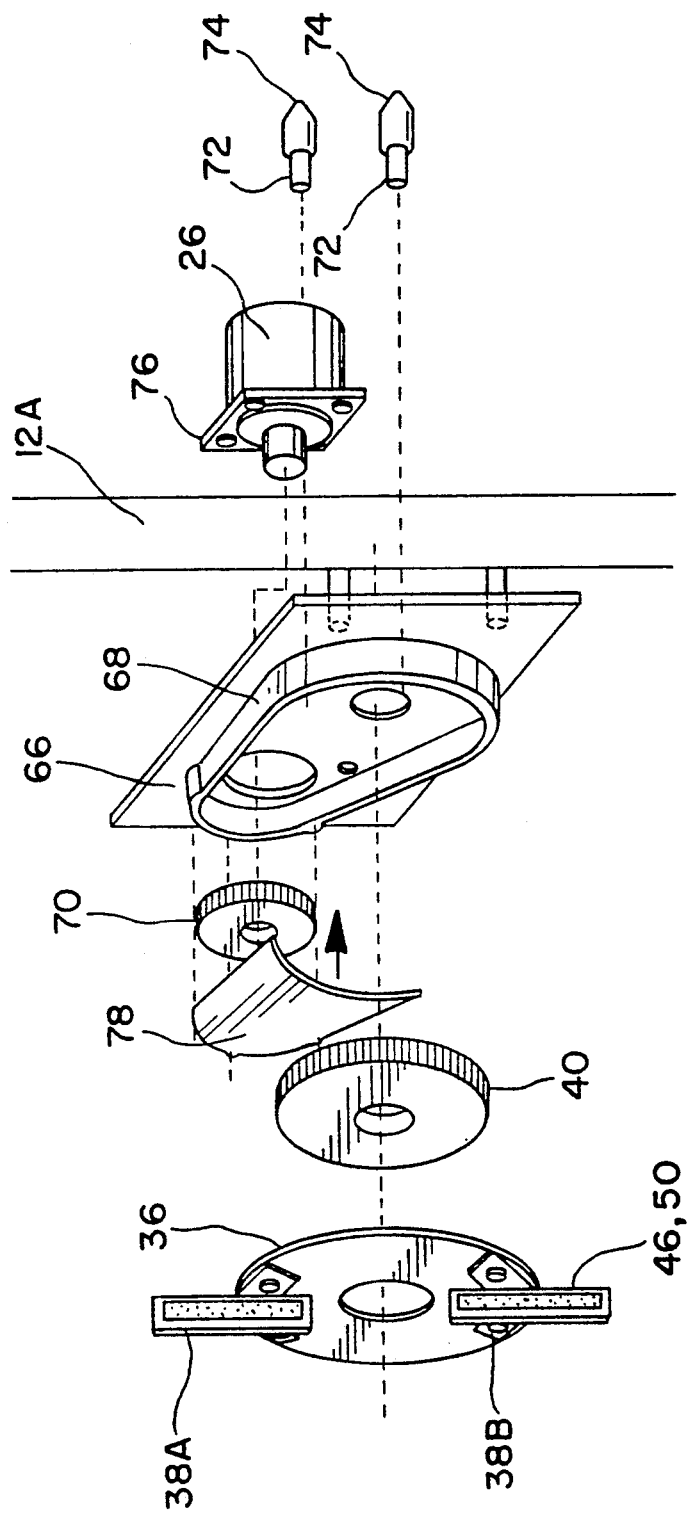
FIG. 7 is an exploded perspective view of a wheel drive system, absent power source and controls, in accordance with a first embodiment of the invention.
Figure 8:
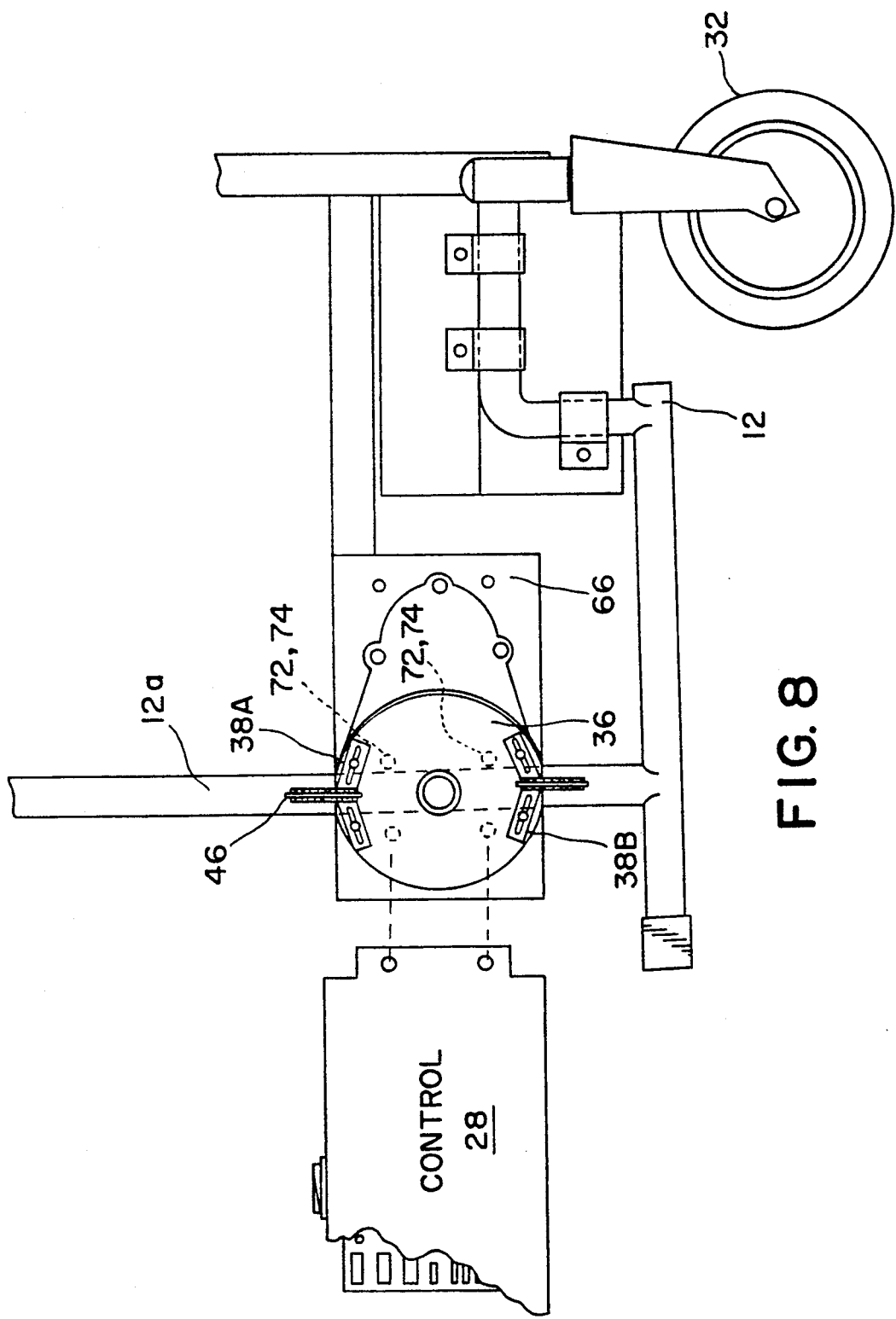
FIG. 8 is a partial side view of a wheelchair, with the driven wheel removed, showing the drive system of FIG. 7 in an installed condition.

Referring to FIGS. 7 and 8, after the drive subassembly has been installed and adjusted, with the tabs 46 firmly contacting wheel spokes and the drive disc 36 secured to gear 40, a motor mounting plate 66 is slipped onto the axle/bolt 18. In the disclosed embodiment a guard 68 is integral with the motor mounting plate 66.

FIG. 7 is an exploded schematic view of an entire wheel drive assembly including the drive motor 26. As may be seen from FIG. 7, a pinion gear 70 is mounted on the motor output shaft and directly engages gear 40. A low gear ratio, i.e., less than 30:1 and preferably as low as 6:1 is achieved. A pair of stops 72 are mounted on and extend from the motor mounting plate 66. The stops 72 are in the form of posts having enlarged, tapered rubber caps 74 which firmly engage a vertical member 12a of the wheelchair side frame 12 to prevent plate 66 from rotating. As an alternative to stops 72, generally J-shaped brackets which contact the chair vertical members can be employed. Such J-shaped brackets can be adjusted in length by providing threaded legs on each bracket, the threaded legs extending through plate 66 and being engaged by wing nuts or the like. The motor 26, is provided with a mounting flange 76 which is bolted to the plate 66. Thus, the torque producer and the means which deliver the generated torque to the wheel are integrated into a single structure, having the motor mounting plate 66 as its base, and this integration also serves to minimize stress on the frame of the chair. All of the torque developed by motor 26 will be transmitted, via the gear train 70, 40, to the wheel 16 via the spoke engaging tab projections 46. It will be understood that the motors 26 will typically not be horizontally aligned, i.e., one motor will customarily be positioned lower than the other. The staggered locations of the motors insures that the chair will have minimum width when folded.

A drive subassembly in accordance with the embodiment of FIGS. 2-8 includes the gear guard 68 which is, in effect, an elliptical rim having a cover 78 which extends over the pinion gear 70. The motor mounting plate 66 and the rim of the gear guard are preferably integral in the interest of enhancing strength and minimizing depth. Other arrangements are, of course, possible. For example, as shown in FIG. 10, the motor mounting plate 66 and gear guard 78 may be integrated into a gearbox housing which is milled from a relatively thick plate of a suitable plastic and a second, thinner plastic plate may function as a gearbox cover.

As mentioned above, the motors 26 employed in the practice of the present invention are preferably DC stepper motors. Suitable motors are available from Eastern Air Devices, Inc. of Dover, N.H. The stepper motors will be provided with rotational position transducers such as, by way of example only, position transducers of the type disclosed in U.S. Pat. No. 4,772,815. The position transducers provide feedback signals which are delivered to the control circuitry as speed and turning control input information. The stepping motors used in the practice of the present invention are characterized by comparatively light weight and small size. The motors should also be characterized by high resistance to rotation when in the energized condition to insure that the chair will be braked in the absence of a command signal commensurate with a desired speed and direction of motion. Additionally, the motors should have sufficiently low detent torque in an "un-energized" state to permit the chair to be easily pushed by a caretaker.

Figure 9:
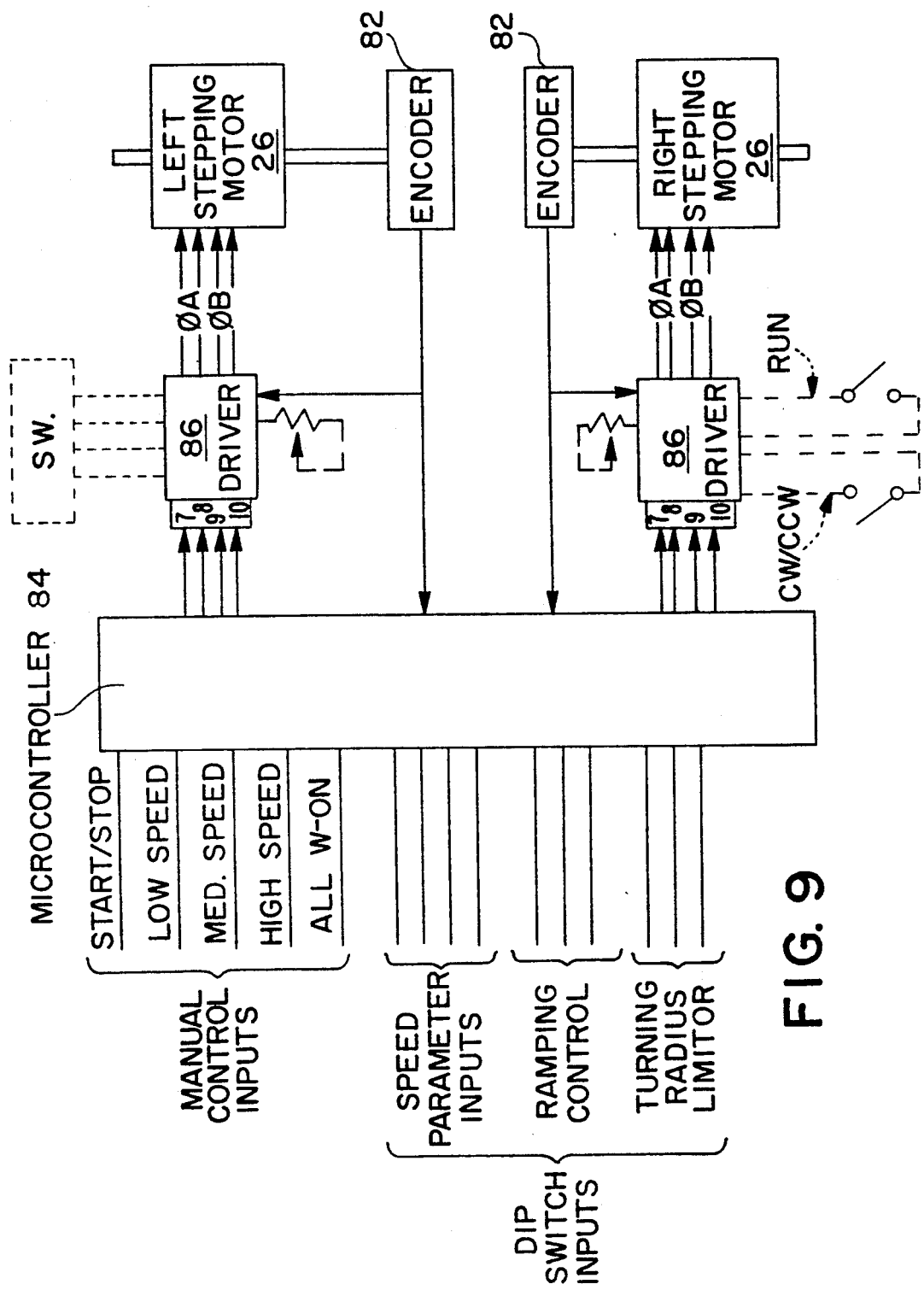
FIG. 9 is a functional block diagram depicting a control system for use in the present invention, the control system of FIG. 9 including a microprocessor for translating manual and other inputs into motor control signals.

Referring again to FIG. 8, the electronic control unit, indicated generally at 28 in FIGS. 1 and 8, may be secured to a motor mounting plate 66 by means of bolts 80. Exemplary control circuitry is depicted in block diagram form in FIG. 9. As discussed above, each motor 26 forms part of a closed loop circuit which includes its associated shaft encoder, the shaft encoders being indicated at 82 in FIG. 9. The shaft encoder output signals will be fed back to a microcontroller 84 which generates the input signals to a driver 86 associated with each motor. The drivers 86, in turn, generate the phase related control signals for the motors in the manner known in the art. Additional inputs to each driver 86 are provided by ganged switches which control energization of the motors and determine whether the motor shaft should rotate in the clockwise or counterclockwise direction. The microcontroller 84 will, in addition to the feedback signals from the shaft encoders 82, be provided with desired function input signals which are generated by the operator, for example through the use of a simple joystick. In addition to the manually generated desired function inputs, additional inputs for microcontroller 84 are provided by, for example, the setting of dip switches. These additional inputs are typically factory selected and include turning radius limiting signals, the turning radius of the chair being a function of the ratio of the speeds of the two motors. An important feature of the present invention is the interconnection of the two drive motors only through electrical cables which extend from control unit 28.

Figure 10:
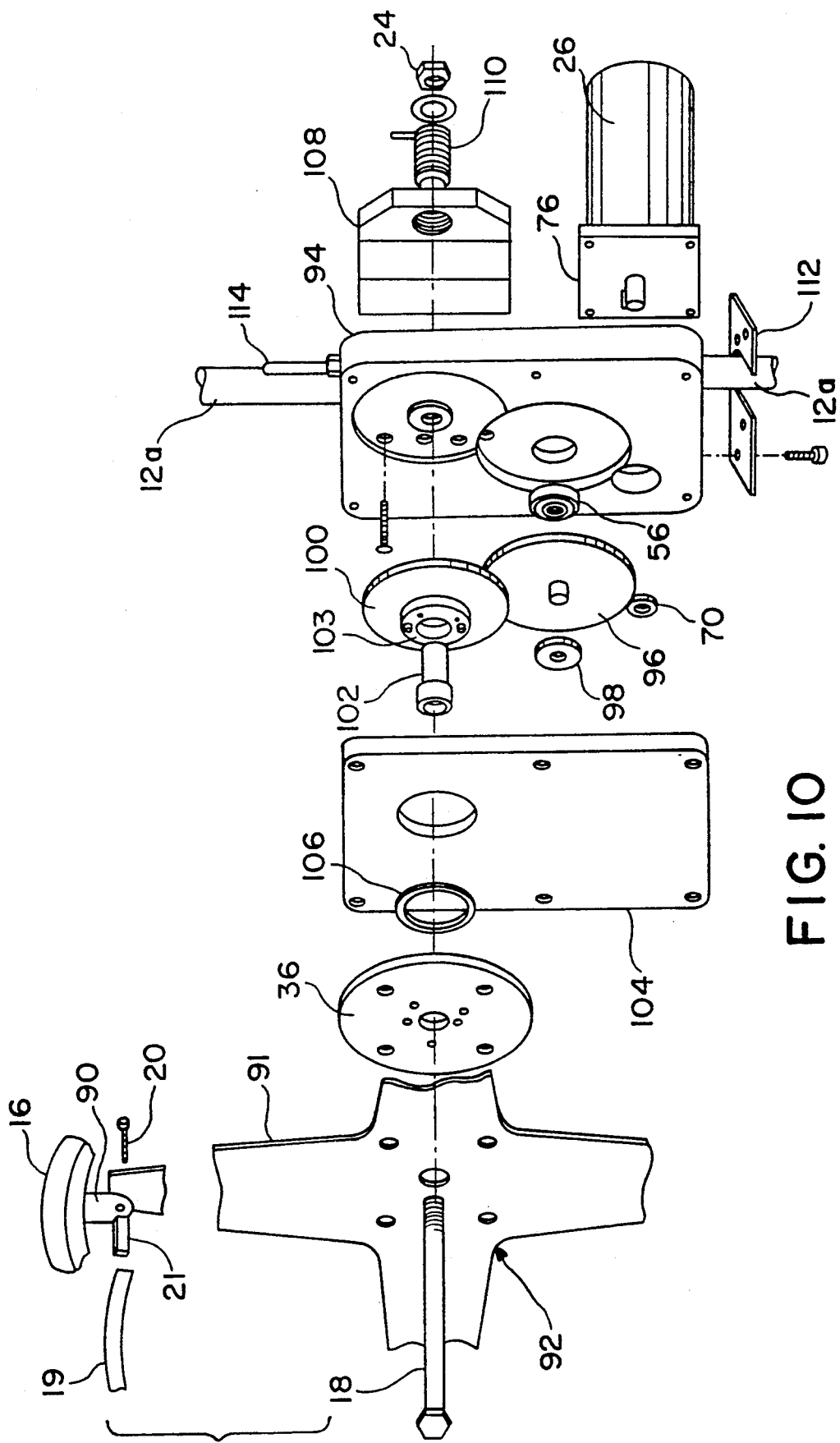
FIG. 10 is an exploded perspective view, similar to the view of FIG. 7, which depicts the preferred embodiment of the invention.

Referring now to FIGS. 10 and 11, the preferred embodiment of the present invention is disclosed. In this preferred embodiment, as mentioned above, the torque developed by motor 26 is applied to the wheel at the diameter of the handrail 19 and, of course, at plural, symmetrically arranged points about the circumference of the circle defined by the handrail. In order to define this large diameter drive, the drive disc 36 is coupled to the handrail support brackets 90, which are integral with and extend radially inwardly from the wheel 16, by means of the lever arms 91 of a "star" plate which is indicated generally at 92. This coupling is established employing the screws 20 which normally affix the handrail 19 to the wheel 16 or, if necessary, screws having the same thread but a slightly longer length. If necessitated by the configuration of the wheel, suitable spacers can be located on the screws 20. In the FIG. 10 embodiment, a gearbox 94 forms the base of the integrated motor/torque delivery means structure which is important to reducing stress on the chair frame.

The embodiment of FIGS. 10 and 11 also differs from the embodiment of FIGS. 2-8 by means of a number of mechanical details, and it will be understood that, for example, the arrangement of FIG. 10, less the star plate 92, can be substituted for the arrangement of FIG. 7 and the drive of FIG. 7 can be employed with the star plate 92. In FIG. 10, a molded gearbox housing 94, to which the motor-mounting flange 76 is bolted, receives the pinion gear 70, which is affixed to the output shaft of motor 26. In the FIG. 10 embodiment, rather than consisting of a single gear 40 as depicted in FIG. 7, the drive train includes gears 96, 98 and 100. Gear 100 is mounted for rotation about a bushing 102 and is coupled, by means of drive pins, to disc 36. The hub 103, from which the drive pins for disc 36 protrude, extends from gear 100 through a gearbox cover 104. An oil seal 106 is provided to effectively seal the interior of gearbox 94 from the ambient atmosphere.

The gearbox 94 is affixed to a vertical member 12a of the wheelchair frame by means of a bracket 108 and the axle bolt 18 passes through bushing 102, gear 100, gearbox 94 and the bracket 108 and is engaged by the nut 24. An axle tension sleeve 110 may be interposed between nut 24 and bracket 108. In addition to the bracket 108, an anti-rotation plate 112 will be attached to the lower end of gearbox 94 and will also engage the frame member 12a.

In the FIG. 10 embodiment, the gearbox 94 is provided with a battery pack support post 114. The battery pack 30 will engage post 114 and, additionally, will rest on the end tube 31 as shown in FIG. 11. The electronic control unit 28 can be similarly mounted at the opposite side of the chair with respect to the battery pack. The control signal generator 34 is designed such that it may be moved from a forward position, where it can be operated by the occupant of the chair, to a rear position (shown in phantom) where it can be operated by a caretaker.

While preferred embodiments of the invention have been disclosed and described, various modifications in addition to the alternatives described above may be implemented without departing from the spirit and scope of the invention. Accordingly, it is to be understood that the present invention has been described by way of illustration and not limitation.

What is claimed is:

1. Apparatus for motorizing a vehicle having a pair of drive wheels, each of the drive wheels having radially extending spokes, the drive wheels of the vehicle being mounted for rotation about respective ones of a pair of axially aligned stationary axles, the axles being supported from spatially separated side frames, said apparatus comprising:

a pair of electric motor means, said motor means each including a drive motor having an output shaft which is rotatable about an axis and a first gear affixed to said shaft;

support means for each of said motor means, said support means being mountable on the vehicle such that the axes of the output shafts of said drive motors will be non-aligned, said support means contacting respective ones of the vehicle side frames to prevent rotation of an associated motor means relative to the axis of the axles;

torque delivery means associated with each of said motor means, said torque delivery means each being supported coaxially of a respective axle and being positioned between an associated wheel and a side frame member of the vehicle, said torque delivery means establishing a frictionless direct drive connection to the associated wheel;

means for coupling each of said first gears to respective ones of said torque delivery means, said coupling means being rotatably mounted on an axle between a wheel and a side frame of the vehicle;

means for generating separate control signals for each of said drive motors, said drive motors and said control signal generating means being interconnected only by flexible electrical cables;

wherein said torque delivery means includes a plurality of spoke engaging members and a second gear, said second gear being in direct engagement with said first gear for establishing a direct drive connection between said motor means and said wheel spokes.

2. The apparatus of claim 1 wherein the vehicle is a wheelchair and said
plurality of spoke engaging member comprises lever means, said lever means extending from said coupling means and establishing a direct drive connection between said coupling means and the wheel spokes.

3. The apparatus of claim 2 wherein said spoke engaging lever means each include tabs having resilient spoke contacting surface portions and wherein said torque delivery means further comprises a carrier member for said tabs.

4. The apparatus of claim 3 wherein said tabs are adjustable relative to said carrier member and said carrier member is attached to said coupling means.

5. The apparatus of claim 4 wherein said drive motors are stepper motors and said means for generating control signals comprise a closed loop control for each motor.

6. The apparatus of claim 1 wherein said drive motors are stepper motors and said means for generating control signals comprise a closed loop control for each motor.

7. The apparatus of claim 2 where said drive motors are stepper motors and said means for generating control signals comprise a closed loop control for each motor.

8. Apparatus for motorizing a foldable wheelchair which has a collapsible frame and pair of drive wheels, the drive wheels being mounted for rotation about respective ones of a pair of axially aligned stationary axles, the axles being supported from spatially separated side frames of said collapsible frame, a handrail being mounted from a rim of each drive wheel to enable the chair to be propelled manually, said handrails being continuous and coaxial with the associated wheel, said handrails having a radius which is less than the drive wheel radius, said apparatus comprising:

- a pair of motor means, said motor means each including an electric drive motor having a rotatable output shaft and a first gear affixed to said shaft;
- means affixed to each of said motor means for supporting said motor means, said supporting means being mountable on the vehicle side frames such that the axes of the output shafts of said drive motors will be nonaligned with one another and will be axially offset from the axis of rotation of the drive wheels, said supporting means engaging respective ones of the vehicle side frames to prevent rotation of an associated motor means relative to the axis of the axles;
- torque delivery means associated with each of said motor means, said torque delivery means each being supported coaxially of a respective axle and being positioned between an associated drive wheel and a side frame member of the vehicle, said torque means including a plurality of radially extending lever arm means, said arm means being of sufficient length to be connectable at outer ends thereof to the drive wheels rim said torque delivery means each establishing a frictionless direct drive connection to the rim of a drive wheel at a plurality of symmetrically arranged points;
- means for coupling each of said motor means first gears to a respective one of said torque delivery means, said coupling means each including at least a second gear which is mounted between a wheel and a side frame for rotation about the axle about which the wheel rotates and a drive disc connected to said second gear, said lever arm means having inner ends connected to said drive disc, a said motor means and its associated torque delivery and coupling means defining an integrated drive unit structure connected to a vehicle side frame by a said supporting means, the two thus defined drive units being mechanically coupled only through the collapsible chair frame; and
- means for generating separate control signals for each of said drive motors.

9. The apparatus of claim 8 wherein said supporting means each comprises a gear box and means for connecting said gear box to a chair side frame, said supporting means further each comprising means for affixing a said motor means to said gear box, and wherein said motors means first gear is disposed in said gear box and said coupling means is in part also disposed in said gear box.

10. The apparatus of claim 8 wherein said coupling means further comprises:

at least a third gear disposed in said gear box between said first and second gears.

11. The apparatus of claim 8 wherein said drive motors are stepper motors.

12. The apparatus of claim 10 wherein said drive motors are stepper motors.

13. The apparatus of claim 8 wherein said symmetrically arranged points are displaced from the axis of rotation by a radial distance which is at least 30% of the wheel radius.

14. The apparatus of claim 8 wherein the vehicle is adaptable for manual propulsion by means of handrails attached to the drive wheels and wherein said symmetrically arranged points are displaced from the axis of rotation by a radial distance which is less than the wheel radius and is approximately the same as a handrail radius.

* * * * *